United States Patent [19]

Klingenberg

[11] Patent Number: 4,563,142
[45] Date of Patent: Jan. 7, 1986

[54] APPARATUS FOR CONTROLLING THE FLOW RESISTANCE IN A SCREW OR WORM EXTRUDER

[75] Inventor: Karl Klingenberg, Porta-Westfalica, Fed. Rep. of Germany

[73] Assignee: Battenfeld Extrusionstechnik GmbH, Bad Oeynhausen, Fed. Rep. of Germany

[21] Appl. No.: 642,047

[22] Filed: Aug. 17, 1984

[30] Foreign Application Priority Data

Aug. 19, 1983 [DE] Fed. Rep. of Germany ....... 3329947

[51] Int. Cl.$^4$ ............................................... B29F 3/06
[52] U.S. Cl. ................................... 425/145; 264/40.6; 425/466
[58] Field of Search ................................ 425/144–146, 425/381, 466, 188, 204, 376 A; 264/40.6, 40.7

[56] References Cited

U.S. PATENT DOCUMENTS 3,008,184 11/1961 Fritsch ................................. 425/204
3,070,836 1/1963 De Haven et al. ................. 425/204

FOREIGN PATENT DOCUMENTS 1554751 7/1971 Fed. Rep. of Germany .
2155855 5/1974 Fed. Rep. of Germany .
8118814 12/1981 Fed. Rep. of Germany .

Primary Examiner—Caleb Weston
Assistant Examiner—Joye Woodard
Attorney, Agent, or Firm—Karl F. Ross; Herbert Dubno

[57] ABSTRACT

A worm press extruder or the like includes a worm shaft which conveys a flow medium within a housing cylinder. In order to provide the medium with an appropriate pressure and temperature the worm shaft cooperates with a constriction plate so as to define a gap therebetween. The gap is controlled by heat responsive unit e.g. a bolt of high thermal expansion coefficient which is connected to a stationary portion of the housing as well as to another housing portion which is movable with respect to the stationary housing portion by lever means. Consequently, when the temperature of the bolt is changed its length is altered thus causing the other housing portion which is associated with the constriction plate to shift towards the stationary housing portion. Since the worm shaft is supported by the stationary housing portion and cannot move axially with respect to the latter, the movement of the constriction plate causes a modification of the gap.

21 Claims, 6 Drawing Figures

APPARATUS FOR CONTROLLING THE FLOW RESISTANCE IN A SCREW OR WORM EXTRUDER

FIELD OF THE INVENTION

The present invention relates to an apparatus for controlling the flow resistance by means of a controlled gap as provided in particular in a worm press, extruder or the like.

BACKGROUND OF THE INVENTION

In worm presses or extruders, the medium (e.g. a plastified synthetic resin) is formed by a worm shaft through a gap defined between a constriction plate surrounding the worm shaft and a counter element arranged on the latter. In order to provide desired flow resistance values, the dimensions of the gap can be varied. The use of these constrictions are required to maintain the medium at a certain pressure and temperature in degasification, homogenizing and/or plastifying zones and for feeding the thermoplastic to implements located at the outlet of the extruder, e.g. the extrusion die or an injection or blow molding head, for different media, or for different operating temperatures, or different speeds of the worm shaft.

The German published specification DE-AS No. 15 54 751 describes the use of a plurality of constriction plates each providing a different diameter of the gap so as to control the flow of the medium i.e. the resistance impeding the flow of the medium. The German published specification DE-AS No. 21 55 855 illustrates in a similar manner the replacement of constriction elements or counter elements with different diameters.

From this prior art it is known that the gap can be varied in order to provide desired pressures or temperatures of the medium. However, these systems have the disadvantage of requiring disassembly of the worm press for replacement of the constriction plate or counter element, respectively, each time a different pressure is required or when the medium has a different temperature or composition. The disassembly of the worm press requires substantial work and above all causes a stoppage of the process.

In order to provide a continuous adjustment of the gap during operation of the worm pressing, the German utility model DE-GM No. 81 18 814 describes a conical constriction plate which is shifted toward a counter element on the worm shaft by means of a drive mechanism. Consequently, the worm press does not require disassembly for adjusting the gap. However, it has the drawback that the parts which are shifted relative to one another are subjected to a considerable stress by the contraction pressure and thus are prestressed by relatively heavy forces. For the drive mechanism, therefore, high performance motors are required via reduction gears to overcome these forces. Thus, the adjustment is cumbersome.

A further drawback of this system is that the adjustment, that is the displacement of the constriction plate, is only possible over a short length which is not sufficient even when using highly viscous grease for lubrication or where the lubricating film is drawn toward the areas supporting each other. Therefore considerable wear is obtained which can be overcome only by utilizing enhanced lubricating systems.

OBJECT OF THE INVENTION

It is the object of the present invention to provide an improved apparatus of the type described for controlling the flow resistance by means of a gap obviating the aforestated drawbacks.

SUMMARY OF THE INVENTION

In accordance with the present invention, the objective is achieved by providing a heat responsive unit of high thermal expansion coefficient, which depending on its temperature, varies its length so that a constriction plate can be shifted toward a counter element in dependence upon the expansion of the heat responsive unit. Through suitable lever means, the change in length of the heat responsive unit is transmitted to the constriction plate.

According to a feature of the invention, the heat responsive unit is a metal bolt or a metal pipe. The latter is preferred as it facilitates the emission or input of heat in view of the reduced penetration depth. The heat responsive unit can quickly be heated by providing heating collars or channels surrounding the unit and accommodating a heating fluid which circulates via a heat exchanger or mixing valve. For cooling the unit, a ventilator is employed which is in communication with a housing or duct enclosing the unit.

The best results are achieved when using the following materials for the heat responsive unit: aluminum alloys and/or magnesium alloys and/or manganese alloys and/or zinc and/or zinc alloys. These material have sufficient mechanical strength and the required heat resistance as well as a relatively high thermal expansion coefficient. Certainly, it is possible to use steel or stainless steel as material for the unit so that wider temperature differences can be obtained.

According to another feature of the invention, the lever means includes two lever assemblies in order to utilize the expansion of the unit for shifting the constriction plate. One end of the unit is connected with one extremity of a control lever whose other extremity acts on a movable housing portion of the worm press which is associated with the constriction plate. The other end of the unit is connected to a bracket which forms a rigid structure via a support lever with a stationary housing portion. The latter supports the worm shaft on which the counter element is provided. Thus, when the unit alters its length, the control lever will move the one housing portion towards the stationary housing portion and thus will force the constriction plate toward the counter element.

Consequently, by simply heating or cooling the heat responsive unit, the gap between the constriction plate and the counter element and thus the flow resistance can be controlled without necessitating any mechanical transmissions. Although the heating consumes energy, the arrangement operates at low costs because the temperature of the unit once obtained can easily be maintained since a thermal insulation is provided by the air duct connected to the ventilator and embracing the unit. By using additional insulating material along the walls of the channel a further reduction of energy consumption is achieved. A further advantage of my present invention resides in the fact that the apparatus acts on the respective parts from the outside so that the worm press or extruder is easily accessible for maintenance, cleaning or inspection. Still another advantage of the apparatus according to the invention is its resistance to wear.

BRIEF DESCRIPTION OF THE DRAWING

The above and other features of the present invention will now be described in detail with reference to the accompanying drawing in which.

SPECIFIC DESCRIPTION

Figure 1:
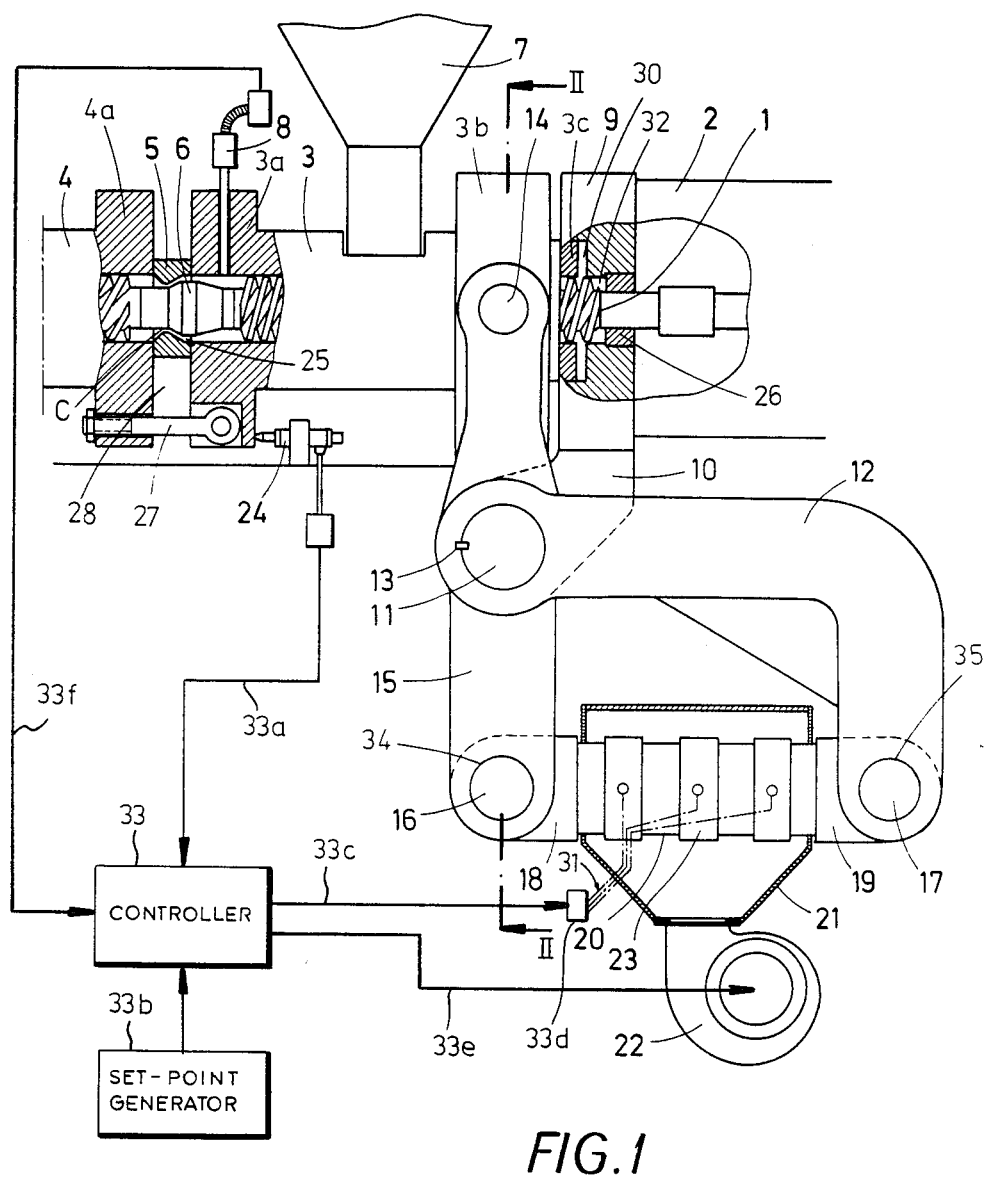
FIG. 1 is a side-elevational view of a worm press provided with an apparatus according to the invention.
Figure 2:
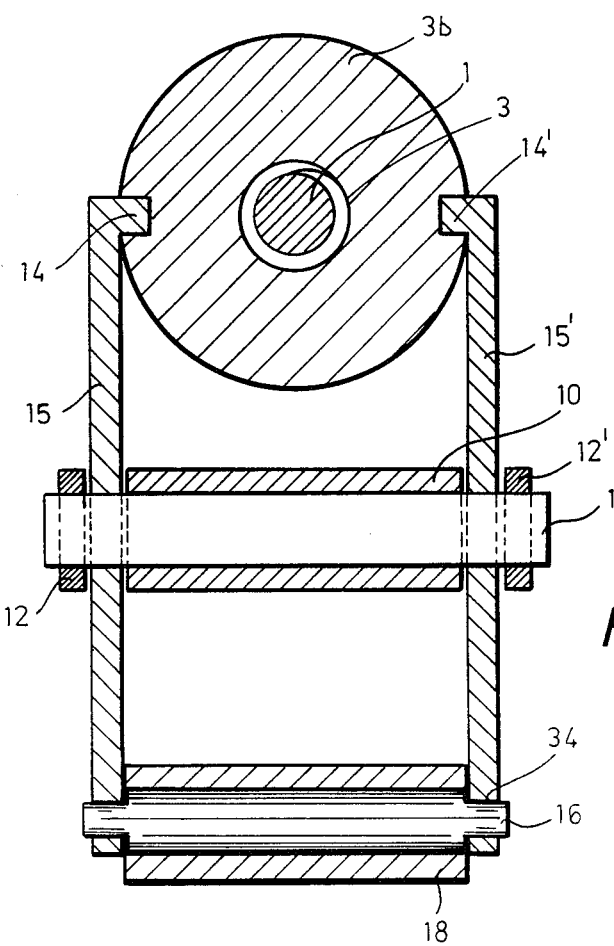
FIG. 2 is a sectional view taken along line II—II of FIG. 1.

In FIG. 1, a worm press is illustrated which includes a worm shaft 1 supported on a horizontal axis within a continuous bore 32 of a cylinder housing. The housing consists of a stationary cylinder portion 2 and two further cylinder portions 3, 4 which are simultaneously movable relative to the cylinder 2. A fixed relation between the cylinders 3, 4 is obtained by a screw joint 27 which connects the flanges 3a, 4a of the respective cylinder 3, 4 in such a manner that a space 28 is formed therebetween. Clamped within the space 28 by the flanges 3a, 4a is a constriction or damming plate 5 which cooperates with a counter member 6 arranged on the worm shaft 1 so as to define a gap 25 therebetween whose size (gap width C) is variable as will be described hereinbelow.

The stationary cylinder 2 supports the worm shaft 1 in respective bearings—one of the bearings is shown and designated by reference numeral 26—in such a way that the worm shaft 1 can rotate but is fixed against an axial movement relative to the cylinder 2. At its extremity facing the cylinder 3, the cylinder 2 is screwed with an end sleeve 9 which is provided with a recess 30 of a diameter larger than the diameter of the bore 32 which is traversed by the worm shaft 1. Facing the end sleeve 9, the cylinder 3 is provided with an end flange 3b and a sleeve-like extension 3c which projects into the recess 30 and is telescopically movable therein. Depending on the position of the extension 3c within the recess, a clearance is obtained which is sealed by sealing element not shown.

Adjacent to the end flange 3b, the cylinder 3 is associated with a feeding device 7 through which the synthetic plastic material to be melted on or homogenized is introduced to the worm shaft 1. The feeding device cooperated with a dosing unit (not shown) so as to allow the supply of a predetermined amount of material to the worm shaft 1. For controlling the temperature as well as the pressure of the material before being forced through the gap 25, a measuring element 8 is provided from outside and extending through the flange 3a to the bore 32. The actual value of the temperature and the pressure is determined by the measuring element 8 which converts it into an input signal for a control unit 33. In addition to the measuring element 8, a sensor 24 is provided which acts on the flange 3a to determine the movement or displacement of the cylinders 3, 4 relative to the cylinder 2. The actual value of the displacement as detected by the sensor 24 is also converted into an input signal which is transmitted to the control unit 33. Although controlling of the gap 25 can be obtained by utilizing either the measuring element 8 or the sensor 24, the provision of both arrangements is preferred so as to be able to control the dimension of the gap 25 (by sensor 24) as well as any desired flow resistance (by measuring element 8).

Integrally connected with the sleeve 9 is an angular support lever 10 whose lower end portion is traversed by a continuous bore through which an axle or shaft 11 is guided. At each side of the lever 10, the axle 11 projects out of the bore beyond the lever 10 for supporting respective control levers 15, 15' and brackets 12, 12'. Through a key 13, the axle is connected to the support lever 10 and the brackets 12, 12' in a nonrotating manner while the control levers 15, 15' located between the lever 10 and the respective bracket 12, 12' can pivot about the axle 11. The upper end of each control lever 15, 15' is provided with a pin 14, 14' engaging in an associated bore arranged at each side of the end flange 3b. Thus, the levers 15, 15' embrace the flange 3b and thus the cylinder 3 in a fork-like manner. At its lower extremity, each control lever 15, 15' is provided with an annular hole 34 for receiving a respective gudgeon 16 of a heat responsive unit 20.

The heat responsive unit 20 is a bolt, preferably a metal bolt, or a metal pipe. The bolt 20 is provided with an end piece 18, 19 at its extremities in longitudinal axis. Radially projecting from the end piece 18 are the gudgeons 16, while the end piece 19 has a gudgeon 17 projecting radially at each side of the end piece 19 into a respective hole 35 of each bracket 12, 12'.

The bolt 20 which must have a sufficiently high thermal expansion coefficient is surrounded by a plurality of heating collars 23 which are associated to the control unit 33 as indicated by dash-dot lines 31. For cooling the bolt 20, an air channel 21 is connected to a ventilator 22 and embraces the bolt 20. Preferably, the bolt 20 supports the air channel 21 and the ventilator 22 in order to simplify the entire arrangement. If necessary, additional cooling ribs can be arranged between the heating collars 23 for enhancing the cooling of the bolt 20. For reasons of simplicity, these cooling ribs are not illustrated in FIG. 1. It is certainly conceivable to surround the bolt 20 by a channel system e.g. in a helical shape which is in communication with a heat exchanger or an equally operating mixing valve so that a circulation of a heating fluid is obtained for keeping the bolt 20 at the requested temperature.

To control the gap 25, the bolt 20 is thus either heated via the shown collars 23 or cooled by the ventilator which generates cooling air along the air channels 21. Assuming that the gap 25 should be narrowed because for example the pressure or the temperature of the material has not the required level, the bolt 20 is heated and thus caused to expand about a certain length so that the lower end of each control lever 15, 15' is moved to the left thereby moving the upper end and thus the cylinder 3 via the pins 14, 14' to the right. Due to the key 13, the cylinder 2 together with the sleeve 9 forms a rigid unit with the support lever 10 and the brackets 12, 12' so that the cylinder 2 will be kept stationary with respect to the cylinder 3. Since, as already described, the worm shaft 1 is supported by the cylinder 2 so as to be prevented from an axial movement with respect thereto, the constriction plate 5 is shifted towards the stationary counter element 6 thereby causing a narrowing of the gap 25. The flow resistance is thus increased which in turn will raise the pressure and the temperature of the material.

In case, the gap 25 is to be enlarged, the bolt is cooled so that its length is reduced. Consequently, the control levers 15, 15' pivot in opposite direction, i.e. the upper end of each lever 15, 15' moves to the left.

In order to obtain a unit as quickly responsive as possible to any change of temperature, the use of a pipe is preferred because its larger surfaces allow a quicker heat emission or heat input. In addition, a pipe can more easily be heated up to a required temperature than e.g. a solid bolt which takes a longer time until the heat penetrates and uniformly heats the bolt.

It has been shown to be useful to control the gap 25 in such a way that the constriction plate 5 has its farthest distance to the counter element 6, i.e. that the gap 25 has its widest dimensions, when the unit 20 is at its lowest temperature which usually will be the ambient temperature that is room temperature. Therefore, the material is conveyed by the worm shaft 1 at lowest possible flow resistance at the gap 25 when starting the worm press. Depending on the desired values of the temperature or pressure, the control unit 33 then initiates the adjustment of the gap 25.

The bolt or pipe 20 is made of a metal which is not only resistant to oxidation but is also heat resistant and provided with a high thermal expansion coefficient. Materials used for the bolt or pipe include e.g. aluminum alloys and/or magnesium alloys and/or manganese alloys and/or zinc and/or zinc alloys or steel or stainless steel. Upon using light alloys like hydronalium or alloy 260(G-AlSi12CuNi), thermal expansion coefficients between 20 and $23 \times 10^{-6}$ (°C.)$^{-1}$ are obtained. When changing the temperature from slightly above the room temperature to a 200° C. higher temperature, the bolt 20 which has about a length of 1 m and is made of a light alloy could easily be extended about 5 mm. Such an extension of the bolt 20 is usually sufficient to control the gap 25 in any desired manner.

By using other materials than light alloys, the expansion coefficient can be increased, however, since the strength of these materials, like e.g. plastics, is not sufficient, a support thereof in respective cylinders is necessary.

Alternatingly, the heat responsive unit 20 could be designed as a telescopic piston-cylinder arrangement whereby the piston is connected to the control levers 15, 15' while the cylinder is fixed to the brackets 12, 12' and contains a material of high thermal expansion coefficient like e.g. lead, or when sufficiently sealing the interior of the cylinder a liquid like mercury. As seals, solid or bellow-like seal elements are especially preferred.

It is also possible to change the displacement of the constriction plate 5 relative to the counter element 6 by altering the transmission ratio of the control levers 15, 15'—which in the present embodiment is 1:1. Furthermore, the use of pivotable control levers 15, 15' may be omitted and the levers supported by the bolt 20 can be rigidly arranged directly on the parts to be moved relative to each other. Especially advantageous is to use not only one of such bolts but several symmetrically arranged around the cylinder housing of the worm press.

It is also within the scope of the present invention to embrace one of the pivot axes of the control levers by an oblong hole or by a block displaceable within a coulisse, or to have the control levers to engage one of the pivot axes via an additional handle.

Referring more specifically to FIG. 1, controller 33, which can operate by conventional servomechanism practice, receives a set point value 33a from the position-measuring device 24 sensing the position of the constriction plate 5 relative to the frame of the machine and hence relative to the worm or screw 1. Consequently this measured parameter represents the actual gap width.

The actual gap width signal is thus supplied to the servocontroller 33 which compares the value with the signal from a set point generator 33b and should the gap width be insufficient, provides an output 33c to a regulator 33d of the heating sleeves 23 surrounding the bolt 20.

Naturally, should the gap width be sufficient or excessive, the controller 33 can provide an output 33e operating the blower 22 which is carried with the duct 21 on the pin. The function of the controller 33 is modified in accordance with the measured values of the temperature and/or pressure upstream of the constriction C as represented by the signal-transmission line 33f running from the sensor 8.

Figure 3:
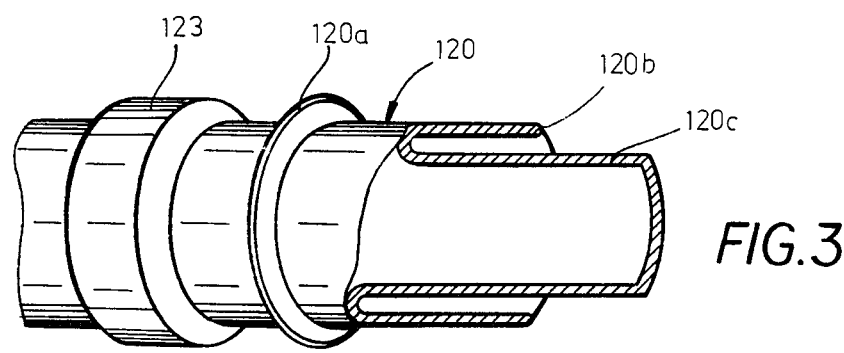
FIG. 3 is a diagrammatic perspective view illustrating a portion of an expansion pin in accordance with a feature of the invention.

In FIG. 3 the pin or bolt 20 forming the thermal expansion element need not be a solid body but can be, for example, a fluid-filled tubular member or hollow member 120 which is provided with fins 120a for promoting heat exchange with the blower air and which can have telescopingly interfitted parts 120b and 120c in a piston and cylinder arrangement which can be filled with a material of high thermal coefficient of expansion, e.g. mercury. The heating sleeve in this embodiment is shown at 123.

Figure 4:
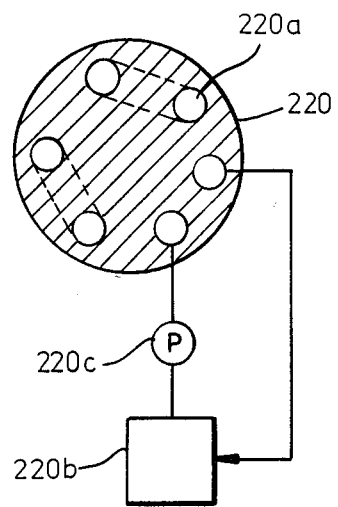
FIG. 4 is a cross section through another expansion pin or bolt.

FIG. 4 illustrates a substantially solid heating pin or bolt 220 which is provided with interconnected bores 220a through which a heating fluid from a heat exchanger represented at 220b can be circulated through the pin by a pump 220c.

Figure 5:
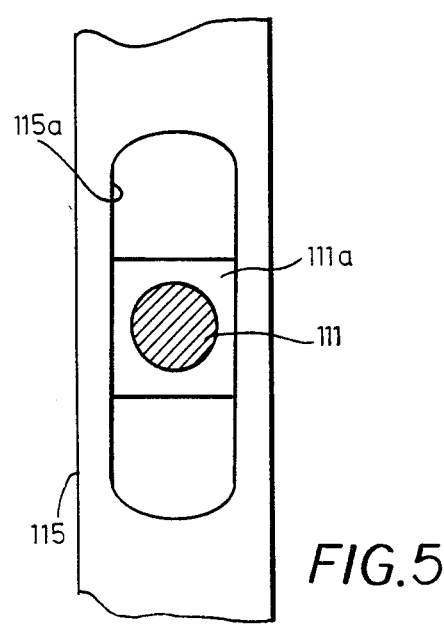
FIG. 5 is a detailed view of a pivot arrangement for use with the system of the invention.

Any of the hinge pins between levers or links according to the invention may be provided with a slide block arrangement and is shown diagrammatically in FIG. 5 for the lever 115 and the shaft 111, respectively equivalent to the lever 15 and the shaft 11 previously described. Here the shaft 111 is rotatable in the guide block 111a which slides in a slot or groove 115a of the lever.

Figure 6:
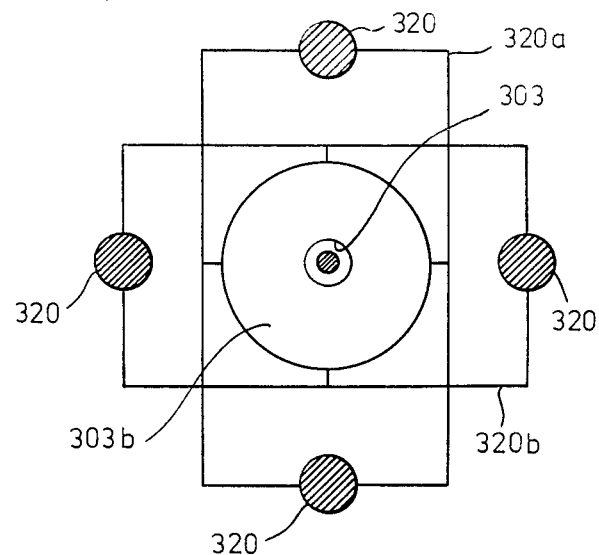
FIG. 6 is a diagram illustrating the layout of an array of expansion pins and bolts showing the movable member of the two portions of the cylinder.

In FIG. 6, shown diagrammatically, is a symmetrical array of pins or bolts 320 which are coupled by respective lever mechanisms 320a and 320b with the movable portions 303b of the shiftable cylinder or housing portion 303.

I claim:
1. A worm extruder, comprising:
a housing having a continuous bore through which a flow medium is conveyed and a worm for conveying said medium, said housing including in series, a stationary cylindrical housing portion and two cylindrical housing portions simultaneously movable with respect to said stationary housing portion;
constriction means for providing a narrowing of said bore at a location between said two housing portions, said constriction means having a first member disposed within a space formed between said two housing portions and a second stationary member, wherein said first and second members cooper- ate with each other to define a variable gap at said location;

a heat-responsive unit of predetermined thermal expansion coefficient;

lever means for transmitting the expansion of said unit to said constriction means, said lever means connecting one end of said unit to one of said two housing portions and the other end thereof to said stationary housing portion so that depending on the expansion of said heat responsive unit, said two housing portions are moved relative to said stationary housing portion thereby moving the first member relative to the second member to adjust the gap and to control the flow resistance; and means for controlling the temperature of said unit to regulate the width of the gap.

2. Apparatus as defined in claim 1 wherein said lever means includes a first lever assembly connecting the one end of said unit with one of said two housing portions and a second lever assembly fixedly connecting the other end of said unit with said stationary housing portion.

3. Apparatus as defined in claim 2 wherein said first lever assembly includes a control lever having one extremity connected to the one end of said unit and a pin at the other extremity of said control lever, said pin projecting into an associated bore provided in said one of two housing portions.

4. Apparatus as defined in claim 3 wherein two such control levers are provided at each side of said one of two housing portions to embrace the latter in a fork-like manner.

5. Apparatus as defined in claim 2 wherein said second lever assembly includes a support lever integral with said stationary housing portion and a bracket having one extremity connected to the other end of said unit so that a rigid structure is provided between said stationary housing portion and said other end of said unit.

6. Apparatus as defined in claim 2 wherein said first lever assembly pivots with respect to the second lever assembly.

7. Apparatus as defined in claim 1 wherein the heat-responsive unit is a metal bolt.

8. Apparatus as defined in claim 1 wherein said heat-responsive unit is a metal pipe.

9. Apparatus as defined in claim 2 wherein said heat responsive unit includes a cylinder containing a substance of high thermal expansion coefficient and a piston telescopingly engaged therein.

10. Apparatus as defined in claim 1 wherein said means for controlling the temperature includes heating means for increasing the temperature of said unit so as to cause an expansion thereof, and cooling means for lowering the temperature of said unit to reverse the expansion.

11. Apparatus as defined in claim 10 wherein said heating means are collars surrounding said unit.

12. Apparatus as defined in claim 10 wherein said heating means include conduits arranged around said unit and defining a multiplicity of channels and a heat exchanger communicating with said channels so that a circulating fluid provides heating of said unit.

13. Apparatus as defined in claim 10 wherein said cooling means includes a ventilator and a conduit communicating with said ventilator and defining a channel embracing said unit, said unit supporting said conduit and said ventilator.

14. Apparatus as defined in claim 10 wherein said cooling means include cooling ribs surrounding said unit.

15. Apparatus as defined in claim 1 wherein said unit is composed of a material selected from the group consisting of aluminium alloy, magnesium alloy, manganese alloy, zinc, zinc alloy, steel, stainless steel, hydonalium and alloy 260.

16. Apparatus as defined in claim 1 wherein said unit has a lowest temperature corresponding to the maximum dimension of the gap.

17. Apparatus as defined in claim 1 wherein said unit has an initial temperature corresponding to the maximum dimension of the gap.

18. Apparatus as defined in claim 1 wherein said lever means includes a lever having an elongated hole and a slide block carrying a pivot axis and shiftable in said hole.

19. Apparatus as defined in claim 7 wherein said unit includes a plurality of such bolts symmetrically arranged around said housing.

20. Apparatus as defined in claim 1, and further comprising a control unit and a sensor associated with said control unit, said sensor detecting the displacement of said two housing portions relative to said stationary housing portion and providing a corresponding input signal which is transmitted to said control unit for determining whether the temperature of said heat responsive unit is to be changed.

21. Apparatus as defined in claim 20 further comprising measuring means for detecting the pressure and the temperature of the medium prior to being forced through the gap, said measuring means being associated with said control unit for providing and transmitting an input signal corresponding to the pressure and the temperature.

* * * * *